United States Patent
Kakutani et al.

(10) Patent No.: US 7,484,093 B2
(45) Date of Patent: Jan. 27, 2009

(54) INFORMATION PROCESSOR AND INFORMATION PROCESSING METHOD

(75) Inventors: Koichiro Kakutani, Tokorozawa (JP); Yuji Matsumoto, Tokorozawa (JP); Yasuyuki Umehara, Tokorozawa (JP); Takashi Irisawa, Tokorozawa (JP); Takeshi Nonaka, Tokorozawa (JP); Yukiyoshi Haraguchi, Tokorozawa (JP); Kyoko Oishi, Tokorozawa (JP); Shinya Sasatani, Tokorozawa (JP); Hayato Watanabe, Tokorozawa (JP); Yuji Shimizu, Tokorozawa (JP)

(73) Assignee: Pioneer Corporation, Meguro-ku, Tokyo-to (JP)

( * ) Notice: Subject to any disclaimer, the term of this patent is extended or adjusted under 35 U.S.C. 154(b) by 693 days.

(21) Appl. No.: 10/840,257

(22) Filed: May 7, 2004

(65) Prior Publication Data

US 2004/0223613 A1     Nov. 11, 2004

(30) Foreign Application Priority Data

May 9, 2003     (JP)     ............................ P2003-132267

(51) Int. Cl.
    *H04L 9/00*     (2006.01)
(52) U.S. Cl. ........................ 713/165; 713/150; 713/164
(58) Field of Classification Search ................. 713/165, 713/164, 150
    See application file for complete search history.

(56) References Cited

U.S. PATENT DOCUMENTS 6,408,074 B1     6/2002     Loughran .................... 380/28

2002/0064370 A1     5/2002     Berkheimer et al. .......... 386/52

OTHER PUBLICATIONS

Novel types of analogic CNN algorithms for recognizing bank-notes Zarandy, A.; Werblin, F.; Roska, T.; Chua, L.O.; CNNA-94, Proceedings of the Third IEEE International Workshop on Cellular Neural Networks and their Applications Dec. 18-21, 1994 pp. 273-278.*
Toward zero-effort perosnal document management Hull, J.J.; Hart, P.E.; Computer vol. 34, Issue 3, Mar. 2001 pp. 30-35.*
Copyright protection for the electronic distribution of text documents Brassil, J.T.; Low, S.; Maxemchuk, N.F.; Proceedings of the IEEE vol. 87, Issue 7, Jul. 1999 pp. 1181-1196.*

* cited by examiner

*Primary Examiner*—David Y Jung
(74) *Attorney, Agent, or Firm*—Drinker Biddle & Reath LLP

(57) ABSTRACT

An information processor including a processing device for recording information on a recording medium or reproducing the information recorded on the recording medium, is provided with: an encrypting/decrypting device which is capable of an encrypting operation for encrypting the information to be recorded when the information is recorded on the recording medium and a decrypting operation for decrypting the information to be reproduced from the recording medium when the information is reproduced from the recording medium; the processing device which includes the two or more encrypting/decrypting devices; a control device which controls the encrypting/decrypting device so as to perform one of the encrypting operation and the decrypting operation; and a switching device which switches a transmission path of the information to the encrypting/decrypting device in response to one of the operations performed by the encrypting/decrypting device.

8 Claims, 10 Drawing Sheets

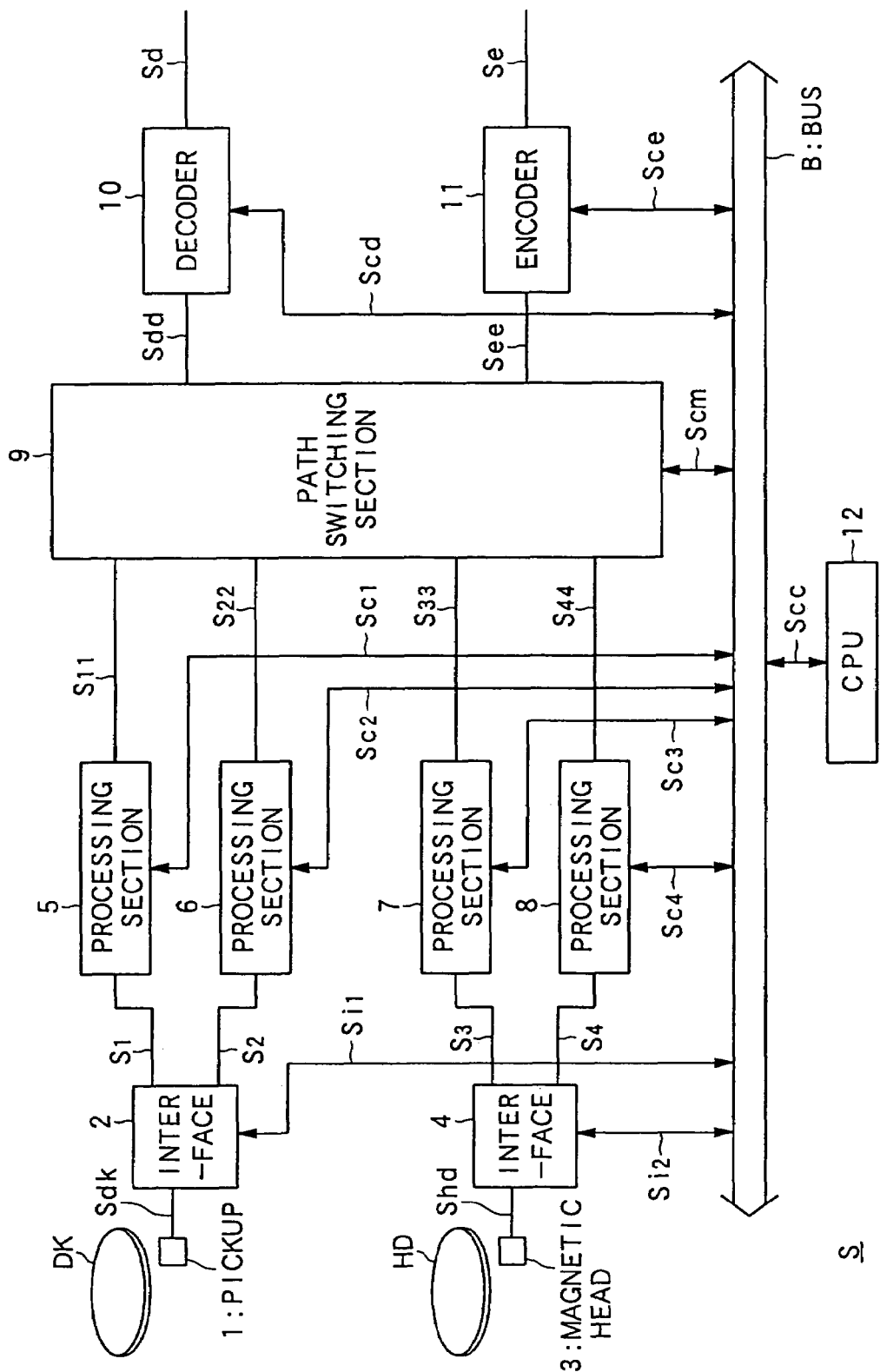

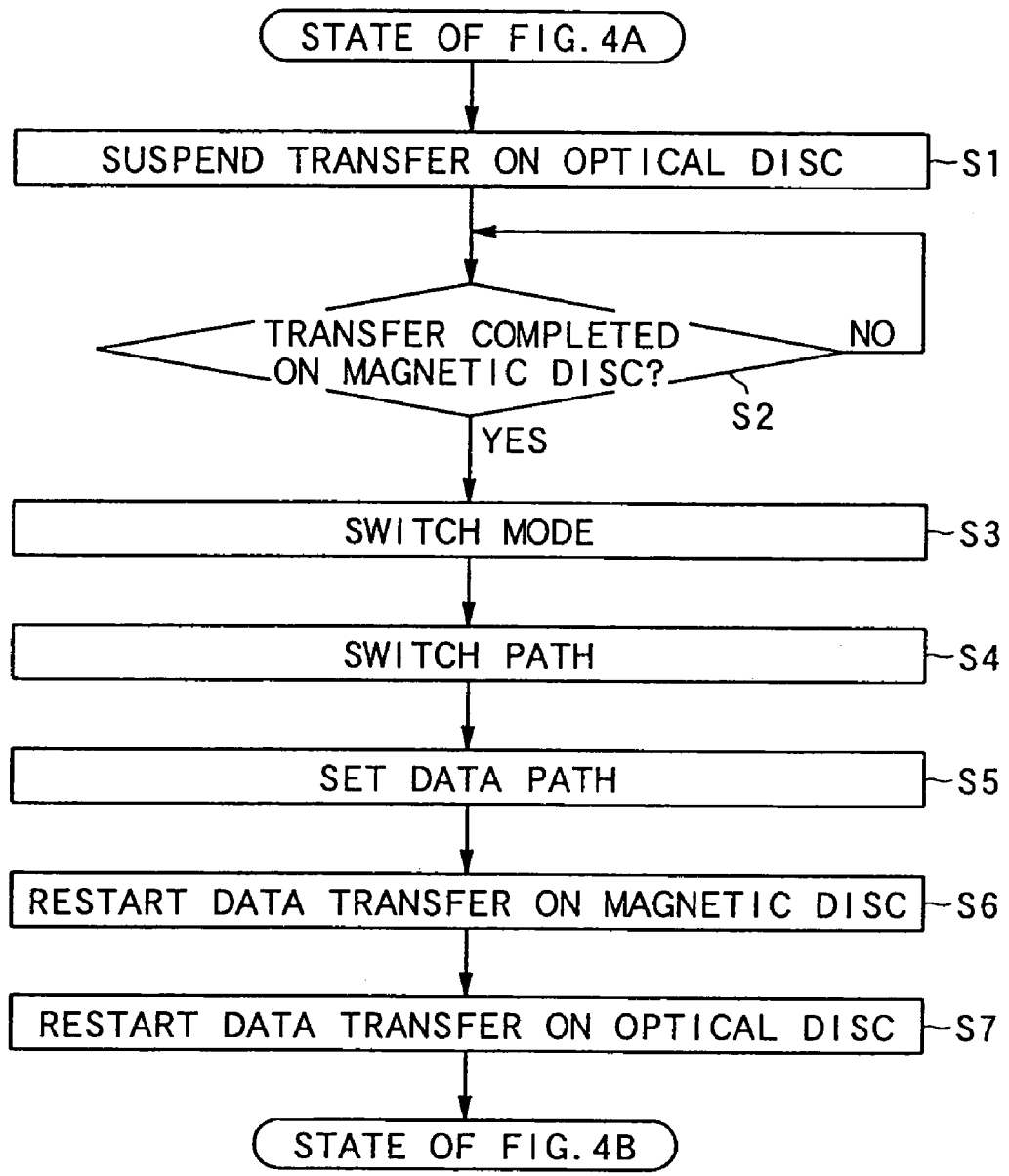

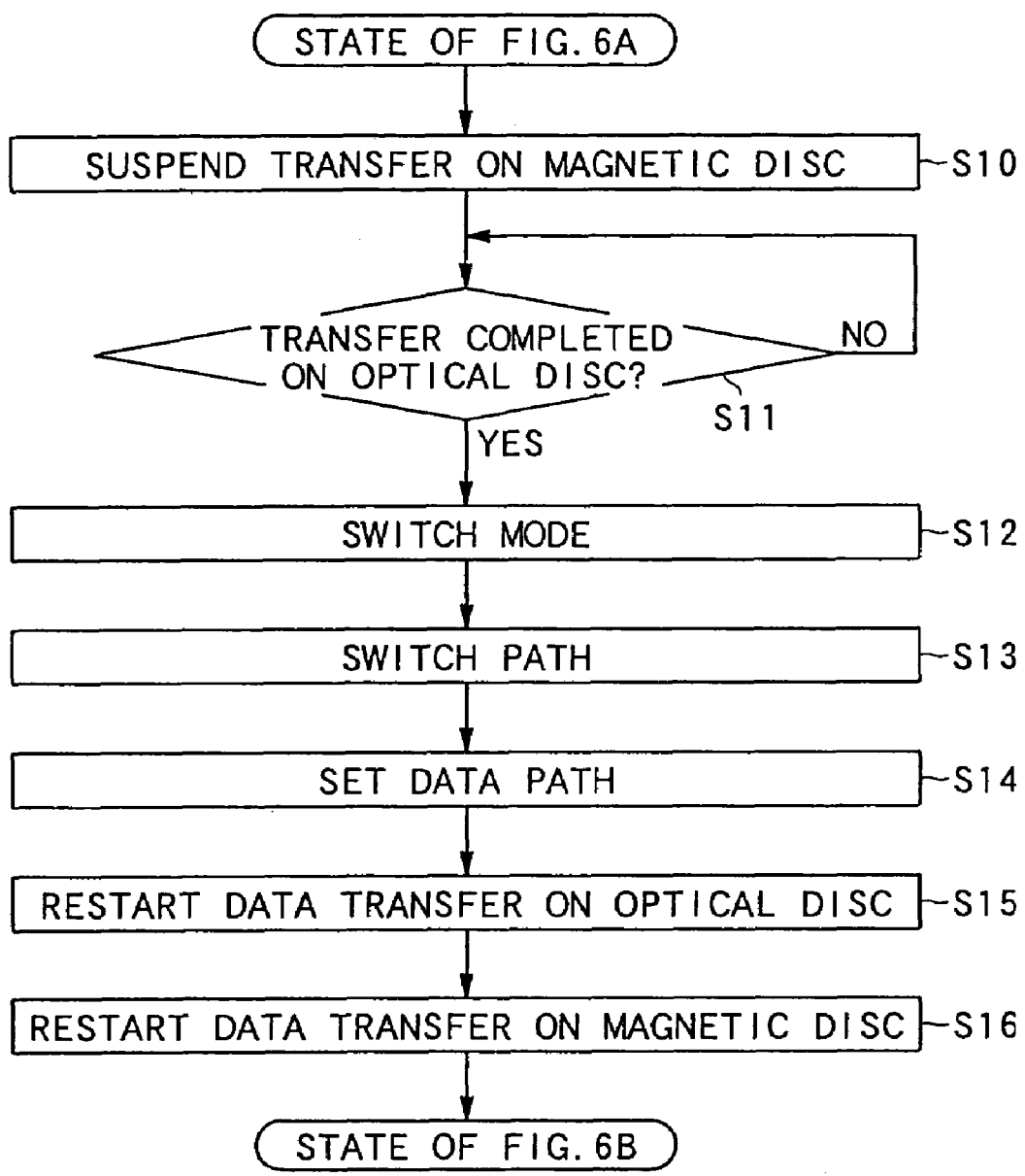

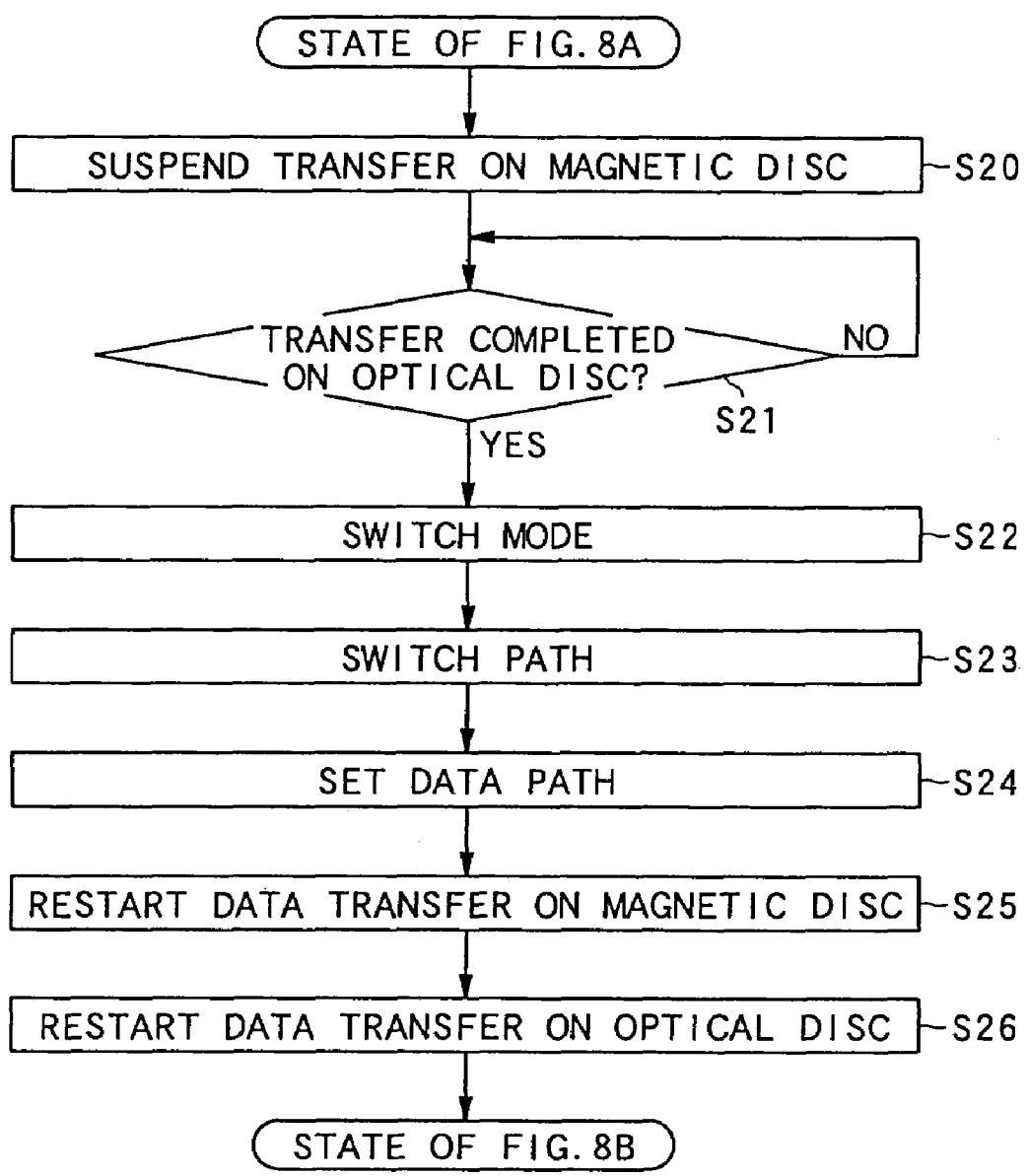

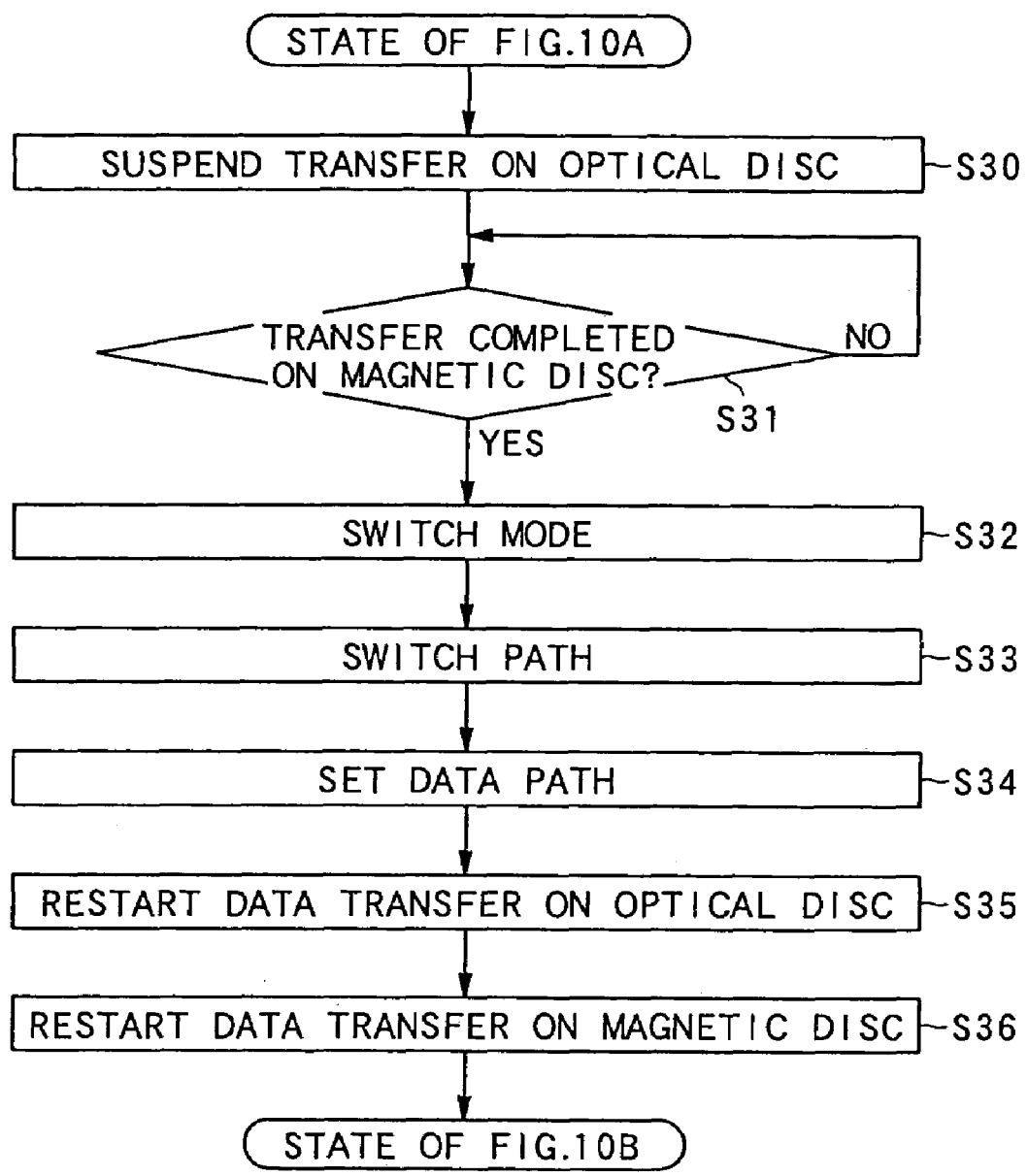

INFORMATION PROCESSOR AND INFORMATION PROCESSING METHOD

BACKGROUND OF THE INVENTION

1. Field of the Invention

The present invention relates to the technical field of an information processor, an information processing method, an information processing program, and an information recording medium. More particularly, the present invention relates to the technical field of an information processor, an information processing method, an information processing program, and an information recording medium for recording the information processing program, by which information is reproduced from the recording medium such as an optical disc concurrently with recording of information on the recording medium.

2. Related Art

Conventionally when information is copied from a recording medium such as an optical disc to another recording medium, in some cases, a different kind of encryption from that of recording on the original recording medium is used to perform copying and recording in order to improve the integrity of the information to be copied.

In this case, in conventionally copiers, decrypting for information detected from an original recording medium (information having been encrypted and recorded) and another encryption for encoded information are carried out by using different circuits. That is, an encryption circuit specifically for encryption and a decrypting circuit specifically for decrypting are provided separately.

However, according to the conventional copiers, the encryption circuit specifically for encryption and the decrypting circuit specifically for decrypting are provided separately and thus the circuit size of the copier is overall increased.

Further, according to the conventional copiers, when information appears to be simultaneously copied, in order to keep the integrity of information, from a recording medium which has recorded two or more pieces of information with different kinds of encryption information used for encrypting information, it is necessary to copy the pieces of information in a mixed state. At this point, the conventional copier has to carry out complicated processing of switching encryption information for decrypting for each minimum division unit in the information to be copied and resetting the encryption circuit or the decrypting circuit by using the switched encryption information to copy the information.

Furthermore, the conventional copiers cannot output a different kind of information to the outside at high speed for another encryption information while copying is carried out together with the decrypting/encryption of one piece of information.

Additionally, when a plurality of encryption circuits and decrypting circuits are arranged in parallel via a single bus to carry out encryption and decrypting in parallel, the transfer rate of information is entirely reduced due to a limit of an amount of information transmitted simultaneously through the bus.

SUMMARY OF THE INVENTION

The present invention is devised in view of the above-described inconveniences. For example, an object of the present invention is to provide an information processor, an information processing method, an information processing program, and an information recording medium for recording the information processing program whereby miniaturization/low cost is achieved by reducing the overall circuit size as compared with the case where encryption and decrypting are carried out by separate circuits or devices, and high-speed information processing is also achieved.

The above object of the present invention can be achieved by an information processor of the present invention. The information processor including a processing device for recording information on a recording medium or reproducing the information recorded on the recording medium, is provided with an encrypting/decrypting device which is capable of an encrypting operation for encrypting the information to be recorded when the information is recorded on the recording medium and a decrypting operation for decrypting the information to be reproduced from the recording medium when the information is reproduced from the recording medium, the processing device is provided with the two or more encrypting/decrypting devices, a control device which controls the encrypting/decrypting device to perform one of the encrypting operation and the decrypting operation, and a switching device which switches a transmission path of the information to the encrypting/decrypting device in response to one of the operations performed by the encrypting/decrypting device.

According to the present invention, encryption and decrypting are performed in the processing section and the transmission paths of information are switched accordingly. Thus, it is possible to reduce the circuit size of the overall information processor S and achieve miniaturization/low cost for the information processor S as compared with the case where encryption and decrypting are performed by separate circuits or devices. Further, since the processing section and the like are provided separately from the interfaces, the processing speed can be improved in the overall information processor by increasing the transfer rates of information in the interfaces. Since the transmission paths are switched by the path switching section to supply information to the processing sections and the decrypter, necessary information can be processed at higher speed as compared with the case where circuits or devices only capable of encryption or decrypting are connected in parallel to a single bus.

In one aspect of the present invention can be achieved by the information processor of the present invention. The information processor of the present invention, is wherein the recording medium can record the information encrypted using different kinds of encryption information, and the encrypting/decrypting device performs the encrypting operation for encrypting the information by using the different kinds of encryption information and performs the decrypting operation by using the encryption information used in the encrypting operation.

According to the present invention, the processing sections correspond to different kinds of encryption information and thus it is possible to achieve compatibility between miniaturization/low cost for the information processor and the integrity of information on the optical disc and the like. The integrity is increased by recording the information which is encrypted with using different kinds of encryption information.

In another aspect of the present invention can be achieved by the information processor of the present invention. The information processor of the present invention, is wherein the processor is provided with the two or more processing devices, the control device and the switching device control the first encrypting/decrypting device provided for the first processing device and switch the transmission path so that the information is decrypted and outputted to an outside, the information having been reproduced from the first recording medium by the first processing device and having been encrypted using the first encryption information, the control device and the switching device control the second encrypting/decrypting device provided for the first processing device so that the information is decrypted, the information having been reproduced from the first recording medium by the first processing device and having been encrypted using the second encryption information, and the control device and the switching device control the first encrypting/decrypting device provided for the second processing device and switch the transmission path so that the information decrypted by the second encrypting/decrypting device is encrypted by the first encrypting/decrypting device provided for the second processing device and the information is recorded on the second recording medium by the second processing device.

According to the present invention, it is possible to quickly reproduce/output information from an optical disc or a magnetic disc HD to the outside in parallel with encryption/copying of information from the optical disc (or the magnetic disc) to the magnetic disc (or the optical disc).

In further aspect of the present invention can be achieved by the information processor of the present invention. The information processor of the present invention, is wherein the processor is provided with the two or more processing devices, the control device and the switching device control a first encrypting/decrypting device provided for a first processing device and switch the transmission path so that the information inputted from an outside is encrypted using first encryption information by the first encrypting/decrypting device provided for the first processing device and the information is recorded on a first recording medium by using the first processing device, the control device and the switching device control the encrypting/decrypting device provided for the second processing device so that the information is decrypted, the information having been reproduced from the second recording medium by the second processing device and having been encrypted using the second encryption information, and the control device and the switching device control the encrypting/decrypting device provided for the second processing device and the second encrypting/decrypting device provided for the first processing device and switch the transmission path so that the information decrypted by the encrypting/decrypting device is encrypted by the second encrypting/decrypting device provided for the first processing device and the information is recorded on the first recording medium by the first processing device.

According to the present invention, it is possible to quickly record information, which has been inputted from the outside, on the optical disc or the magnetic disc in parallel with the encryption/copying of information from the optical disc (or the magnetic disc) to the magnetic disc (or the optical disc).

In further aspect of the present invention can be achieved by the information processor of the present invention. The information processor of the present invention, is wherein the encrypting/decrypting device is provided with a first selecting device for selecting one of the predetermined encryption information and predetermined inverse encryption information indicating an inverse operation with respect to the encryption information; a second selecting device for selecting one of the information and encryption information to be decrypted, the encryption information being obtained by encrypting the information; and an operation device for performing one of the encrypting operation or the decrypting operation according to a selection result from the first selecting device and the second selecting device, when the encrypting/decrypting device is caused to perform the encrypting operation, the control device causes the first selecting device to select the encryption information and the second selecting device to select the information, and controls the operation device so that the encrypting operation is performed in the operation device according to the selected encryption information and the selected information, and when the encrypting/decrypting device is caused to perform the decrypting operation, the control device causes the first selecting device to select the inverse encryption information and the second selecting device to select the encryption information, and controls the operation device so that the decrypting operation serving as an inverse operation with respect to the encrypting operation is performed in the operation device according to the selected inverse encryption information and the selected encryption information.

According to the present invention, in the processing sections, the second operation part performs encryption and decrypting by using the selection results of the first selecting part and the second selecting part, which are provided in each of the processing sections. Hence, necessary encryption and decrypting can be quickly performed with a simple circuit configuration.

The above object of the present invention can be achieved by an information processing method of the present invention. The information processing method performed in an information processor is provided with: a processing device for recording information on a recording medium or reproducing the information recorded on the recording medium, and an encrypting/decrypting device capable of an encrypting operation for encrypting the information to be recorded when the information is recorded on the recording medium and a decrypting operation for decrypting the information to be reproduced from the recording medium when the information is reproduced from the recording medium, the processing device is provided with two or more such encrypting/decrypting devices, the method is provided with: a controlling process of controlling the encrypting/decrypting device so as to perform one of the encrypting operation and the decrypting operation; and a switching process of switching a transmission path of the information to the encrypting/decrypting device in response to one of the operations performed by the encrypting/decrypting device.

According to the present invention, encryption and decrypting are performed in the processing section and the transmission paths of information are switched accordingly. Thus, it is possible to reduce the circuit size of the overall information processor S and achieve miniaturization/low cost for the information processor S as compared with the case where encryption and decrypting are performed by separate circuits or devices. Further, since the processing section and the like are provided separately from the interfaces, the processing speed can be improved in the overall information processor by increasing the transfer rates of information in the interfaces. Since the transmission paths are switched by the path switching section to supply information to the processing sections and the decrypter, necessary information can be processed at higher speed as compared with the case where circuits or devices only capable of encryption or decrypting are connected in parallel to a single bus.

The above object of the present invention can be achieved by an information processing program of the present invention. The information processing program for a computer which is included in an information processor is provided with a processing device for at least recording information on a recording medium or reproducing the information recorded on the recording medium, the program causing the computer to function as: an encrypting/decrypting device which is capable of an encrypting operation for encrypting the information to be recorded when the information is recorded on the recording medium and a decrypting operation for decrypting the information to be reproduced from the recording medium when the information is reproduced from the recording medium, the processing device is provided with two or more such encrypting/decrypting devices; a control device which controls the encrypting/decrypting device so as to perform one of the encrypting operation and the decrypting operation; and a switching device which switches a transmission path of the information to the encrypting/decrypting device in response to one of the operations performed by the encrypting/decrypting device.

According to the present invention, encryption and decrypting are performed in the processing section and the transmission paths of information are switched accordingly. Thus, it is possible to reduce the circuit size of the overall information processor S and achieve miniaturization/low cost for the information processor S as compared with the case where encryption and decrypting are performed by separate circuits or devices. Further, since the processing section and the like are provided separately from the interfaces, the processing speed can be improved in the overall information processor by increasing the transfer rates of information in the interfaces. Since the transmission paths are switched by the path switching section to supply information to the processing sections and the decrypter, necessary information can be processed at higher speed as compared with the case where circuits or devices only capable of encryption or decrypting are connected in parallel to a single bus.

BRIEF DESCRIPTION OF THE DRAWINGS

FIG. 1 is a block diagram showing the schematic configuration of an information processor according to an embodiment;

FIG. 3 is a flowchart showing the switching operation of Embodiment 1;

FIG. 5 is a flowchart showing a switching operation according to Embodiment 2;

FIG. 7 is a flowchart showing a switching operation according to Embodiment 3;

FIG. 9 is a flowchart showing a switching operation according to Embodiment 4;

DETAILED DESCRIPTION OF THE PREFERRED EMBODIMENTS

Figure 2A:
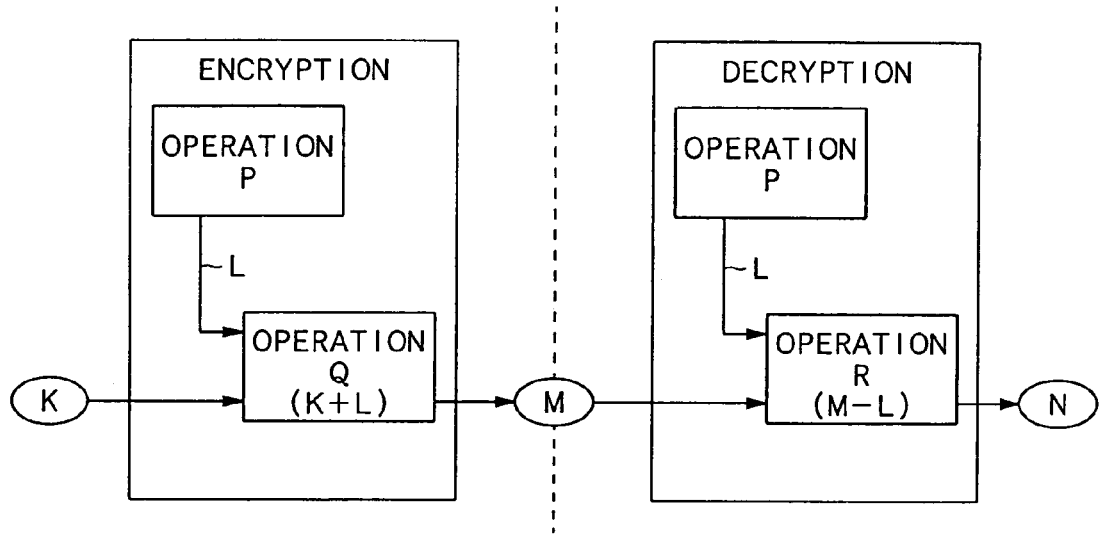
FIG. 2A is a block diagram for explaining the operating principle of the processing section.

Preferred embodiments of the present invention will be described below in accordance with accompanying drawings. In the embodiments described below, the present invention is applied to an information processor is provided with both of an optical pickup which records or reproduces information on a recordable optical disc such as a CD (Compact Disc) or a DVD (Digital Versatile Disc) and a magnetic head which records or reproduces information on a recordable magnetic disc such as a hard disc.

Referring to FIGS. 1 and 2, the overall configuration and operations of the information processor-will be first discussed according to the embodiments.

FIG. 1 is a block diagram showing the schematic configuration of the information processor according to the embodiments. FIG. 2 is a block diagram showing the detailed configuration of a processing section according to the embodiments.

As shown in FIG. 1, an information processor S of the embodiments is constituted of a pickup 1 serving as processing means for recording or reproducing information on an optical disc DK, a magnetic head 3 serving as processing means for recording or reproducing information on a magnetic disc HD, interfaces 2 and 4, processing sections 5 to 8 serving as encrypting/decrypting means, a path switching section 9 serving as switching means, a decoder 10, an encoder 11, and a CPU 12 serving as control means. The interfaces 2 and 4, the processing sections 5 to 8, the path switching section 9, decoder 10, the encoder 11, and the CPU 12 can transmit and receive information to and from one another via a bus B.

The operations will be discussed below.

First the optical disc DK is rotated by a spindle motor (not shown) according to a predetermined number of revolutions. In response, the optical pickup 1 emits a light beam (not shown) to record or reproduce information.

At this point, information to be recorded on the optical disc DK by the pickup 1 is outputted as recording/reproducing information Sdk from the interface 2 to the pickup 1, and the information is optically recorded on the optical disc DK. Further, information optically detected by the pickup 1 from the optical disc DK is outputted as the recording/reproducing information Sdk from the pickup 1 to the interface 2. The focal position of the light beam is controlled by a tracking servo circuit and a focus servo circuit (not shown) during the recording or reproduction of the information.

When information encrypted by the processing section 5 is recorded on the optical disc DK, the interface 2 receives from the processing section 5 the encrypted information to be recorded, the information being received as processing section information S1 according to control information Si1 outputted from the CPU 12 via the bus B. The interface 2 performs predetermined interface processing on the processing section information S1 and outputs the information as the recording/reproducing information Sdk to the pickup 1. Further, when information detected from the optical disc DK is decrypted in the processing section 5, the interface 2 receives the information detected from the optical disc DK, the information being received as the recording/reproducing information Sdk from the pickup 1 similarly according to the control information Si1. The interface 2 performs the interface processing on the recording/reproducing information Sdk and outputs the information as processing section information S1 to the processing section 5.

When information encrypted by the processing section 6 is recorded in the optical disc DK, the interface 2 receives the encrypted information to be recorded, the information being received as processing section information S2 from the processing section 6 similarly according to the control information Si1. The interface 2 performs the interface processing on the processing section information S2 and outputs the information as the recording/reproducing information Sdk to the pickup 1. When information detected from the optical disc DK is decrypted in the processing section 6, the interface 2 receives the information detected from the optical disc DK, the information being received as the recording/reproducing information Sdk from the pickup 1 similarly according to the control information Si1. The interface 2 performs the interface processing on the recording/reproducing information Sdk and outputs the information as processing section information S2 to the processing section 6.

The magnetic disc HD is rotated by another spindle motor (not shown) according to a predetermined number of revolutions as in the case of the optical disc DK. In response, the magnetic head 3 magnetically record or reproduce information.

At this point, information to be recorded on the magnetic disc HD by the magnetic head 3 is outputted as recording/reproducing information Shd from the interface 4 to the magnetic head 3, and the information is magnetically recorded on the magnetic disc HD. Further, information magnetically detected from the magnetic disc HD by the magnetic head 3 is outputted as the recording/reproducing information Shd from the magnetic head 3 to the interface 4.

When information encrypted by the processing section 7 is recorded on the magnetic disc HD, the interface 4 receives the encrypted information to be recorded, the information being received as processing section information S3 from the processing section 7 according to control information Si2 outputted from the CPU 12 via the bus B. The interface 4 performs predetermined interface processing on the processing section information S3 and outputs the information as the recording/reproducing information Shd to the magnetic head 3. Further, when information detected from the magnetic disc HD is decrypted in the processing section 7, the interface 4 receives the information detected from the magnetic disc HD, the information being received as the recording/reproducing information Shd from the magnetic head 3 similarly according to the control information Si2. The interface 4 performs the interface processing on the recording/reproducing information Shd and outputs the information as processing section information S3 to the processing section 7.

When information encrypted by the processing section 8 is recorded on the magnetic disc HD, the interface 4 receives the encrypted information to be recorded, the information being received as processing section information S4 from the processing section 8 similarly according to the control information Si2. The interface 4 performs the interface processing on the processing section information S4 and outputs the information as the recording/reproducing information Shd to the magnetic head 3. When information detected from the magnetic disc HD is decrypted in the processing section 8, the interface 4 receives the information detected from the magnetic disc HD, the information being received as the recording/reproducing information Shd from the magnetic head 3 similarly according to the control information Si2. The interface 4 performs the interface processing on the recording/ reproducing information Shd and outputs the information as processing section information S4 to the processing section 8.

Subsequently the operations of the processing sections 5 to 8 will be described below. The processing sections 5 to 8 have the same functions and thus the operations of the processing section 5 will be discussed as a representative in the following explanation.

When information to be recorded on the optical disc DK is encrypted, the processing section 5 receives the information to be encrypted, the information being received as processing section information S11 from the path switching section 9 according to control information Sc1 outputted from the CPU 12 via the bus B. The processing section 5 performs encryption, which will be discussed later, on the processing section information S11 and outputs the information as processing section information S1 to the interface 2. When information detected from the optical disc DK is decrypted, the processing section 5 receives information detected from the optical disc DK, the information being received as the processing section information S1 from the interface 2 similarly according to the control information Sc1. The processing section 5 performs decrypting, which will be discussed later, on the processing section information S1 and outputs the information as processing section information S11 to the path switching section 9.

In the processing sections 6 to 8 other than the processing section 5, the same operations as the processing section 5 are performed between the interface 2 or 4 and the path switching section 9 according to control information Sc2, Sc3, and Sc4 that are outputted from the CPU 12 via the bus B.

Then, the path switching section 9 switches information transmission paths, which will be discussed later, according to control information Scm outputted from the CPU 12 via the bus B, outputs necessary information as processing section information S11, S22, S33, and S44 to the processing sections 5 to 8, and outputs information to be outputted from the information processor S to the outside (information reproduced from each disc) as output information Sdd to the decoder 10. Further, the path switching section 9 receives information inputted from the outside to the information processor S (information to be recorded on each disc), the information being received as input information See from the encoder 11. Then, the path switching section 9 outputs the information as the processing information S11, S22, S33 and S44 to the processing sections 5 to 8, respectively.

Subsequently the decoder 10 performs predetermined decoding on the output information Sdd, which has been outputted from the bus switching section 9, according to control information Scd outputted from the CPU 12 via the bus B and outputs the information as decoding information Sd to the outside via an output terminal (not shown).

In response, the encoder 11 performs predetermined encoding on external input information Se, which has been inputted from outside via an input terminal (not shown), according to control information Sce outputted from the CPU 12 via the bus B, and outputs the information as the input information See to the path switching section 9.

In parallel with these operations, the CPU 12 generates control information Scc serving as the control information Si1, Si2, Sc1, Sc2, Sc3, Sc4, Scm, Scd or Sce via the bus B and outputs the information Scc to the bus B in order to control the components constituting the information processor S and carry out recording and the like of information. The recording will be discussed later.

Referring to FIG. 2, the detailed configuration and operations of the processing sections will be described below. As described above, the processing sections 5 to 8 have the same configurations and thus the processing section 5 will be discussed as a representative in the following explanation.

Figure 2B:
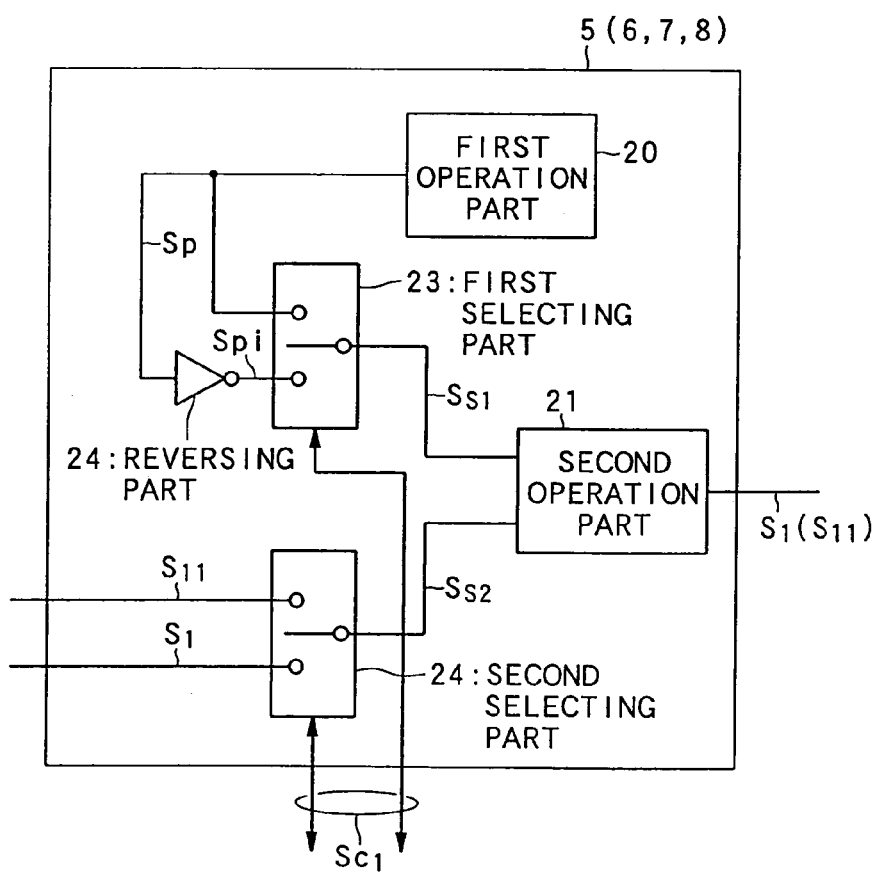
FIG. 2B is a block diagram showing the detailed configuration of the processing section.

FIG. 2A is a conceptual diagram for explaining the processing principle of the processing section 5, and FIG. 2B is a block diagram showing the specific configuration of the processing section 5.

As described above, in the processing section 5, a single component (chip) performs encryption on the processing section information S11 when information to be recorded on the optical disc DK is encrypted, and performs decrypting on the processing section information S1 when information detected from the optical disc DK is decrypted. The principle will be first discussed below.

In general, encryption and decrypting have a so-called mirror relationship. For example, the relationship can be considered as combined processing which has a step of performing the same operation in encryption and decrypting as indicated by operation P of FIG. 2A and a step of performing reverse operations in encryption and decrypting as indicated by an addition of operation Q and a subtraction of operation R in FIG. 2A.

To be specific, in FIG. 2A, information K indicates original information to be encrypted, information L indicates resultant information obtained by operation P, information M indicates resultant information obtained by encrypting the information K, and information N indicates resultant information obtained by decrypting the information M. The information K and the information N match with each other. In FIG. 2A, operation R performs the processing of (information M)−(information L). The operation R can be replaced with (information M)+(−information L). As a result, it can be assumed that the operation Q and the operation R are both adding step, though the operations are supplied with different kinds of information. In this way, encryption and decrypting share many processing steps. The processing section 5 is constituted as a single common processing unit as shown in FIG. 2B and information provided to the common processing unit is arbitrarily selected, so that encryption or decrypting can be switched and carried out in a time-sharing manner in the single common processing unit.

Referring to FIG. 2B, the following will describe the specific configuration of the processing section 5 which is based on the above principle.

As shown in FIG. 2B, the processing section 5 of the present embodiment is constituted of a first operation part 20, a second operation part 21 serving as an arithmetic part, a reversing part 22, a first selecting part 23 serving as first selecting means, and a second selecting part 24 serving as second selecting means.

The detailed operations will be discussed below.

First when the processing section 5 is used to encrypt the processing section information S11 and generate the processing section information S1, the operation part 20 generates encryption information Sp (which is equivalent to the information L of FIG. 2A and temporarily has a value of "L") for encrypting the processing section information S11 according to predetermined processing, and the operation part 20 outputs the information to the reversing part 22 and one of the input terminals of the first selecting part 23.

Then, the reversing part 22 reverses the sign of the inputted encryption information Sp to generate inverse encryption information Spi (having a value of "−L") and outputs the information to the other input terminal of the first selecting part 23.

With these operations, based on the control information Sc1 outputted from the CPU 12 via the bus B, the first selecting part 23 selects the terminal having been fed with the encryption information Sp when the processing section information S11 is encrypted, and the first selecting part 23 outputs the encryption information Sp as selection information Ss1 to one of the terminals of the second operation part 21.

On the other hand, the processing section information S11 is inputted to one of the input terminals of the second selecting part 24 and the processing section information S1 is inputted to the other input terminal of the second selecting part 24.

Based on the control information outputted from the CPU 12 via the bus B, the second selecting part 24 selects the terminal having been fed with the processing section information S11 when the processing section information S11 is encrypted, and the second selecting part 24 outputs the processing section information S11 (which is equivalent to the information K of FIG. 2A and temporarily has a value of "K") as selection information Ss2 to the second operation part 21.

With these operations, the second operation part 21 performs predetermined encryption/decrypting operations (e.g. an addition (L+K)) by using information included in the selection information Ss1 (in this case, the encryption information Sp (having a value of "L")) and information included in the selection information Ss2 (in this case, the processing section information S11 (having a value of "K")) generates the encrypted processing section information S1 as a result, and outputs the information to the interface 2.

Subsequently when the processing section 5 is used to decrypte the processing section information S1 (which is equivalent to the information M of FIG. 2A and temporarily has a value of "M") and generate the processing section information S11, the first operation part 20 generates the encryption information Sp as in the encryption of the processing section information S11, and outputs the information Sp to the reversing part 22 and one of the input terminals of the first selecting part 23.

Then, the reversing part 22 generates the inverse encryption information Spi as in the encryption of the processing section information S11, and outputs the information Spi to the other input terminal of the first selecting part 23.

With these operations, based on the control information Sc1 outputted from the CPU 12 via the bus B, the first selecting part 23 selects the terminal having been fed with the inverse encryption information Spi when the processing section information S1 is decrypted, and outputs the inverse encryption information Spi as selection information Ss1 to one of the terminals of the second operation part 21.

On the other hand, based on the control information Sc1 outputted from the CPU 12 via the bus B, the second selecting part 24 selects the terminal having been fed with the processing section information S1 when the processing section information S1 is decrypted, and outputs the processing section information S1 as selection information Ss2 to the second operation part 21.

With these operations, the second operation part 21 performs encryption/decrypting operations (e.g. a subtraction (M−L)) as in the encryption of the processing section information S11, by using information included in the selection information Ss1 (in this case, the inverse encryption information Spi (having a value of "−L")) and information included in the selection information Ss2 (in this case, the processing section information S1 (having a value of "M")), and the second operation part 21 generates the encrypted processing section information S11 as a result and outputs the information to the path switching section 9.

The foregoing operations are similarly carried out in the other processing sections 6 to 8.

The above operations in the processing sections 5 to 8 indicate a specific configuration example where encryption and decrypting are performed by a single member. Various other configurations are available for performing encryption and decrypting by using a single member.

Referring to FIGS. 3 to 10, the following will specifically describe an example of switching recording and reproduction in the information processor S which is configured thus and performs the operations according to the embodiments.

FIGS. 3, 5, 7, and 9 are flowcharts showing the embodiments corresponding to the switching operation performed mainly in the CPU 12. FIGS. 4, 6, 8, and 10 are block diagrams showing the information flow of the switching operation according to the embodiments.

(I) Embodiment 1 of the Switching Operation

Referring to FIGS. 3 and 4, Embodiment 1 of the switching operation will be discussed first.

Figure 4A:
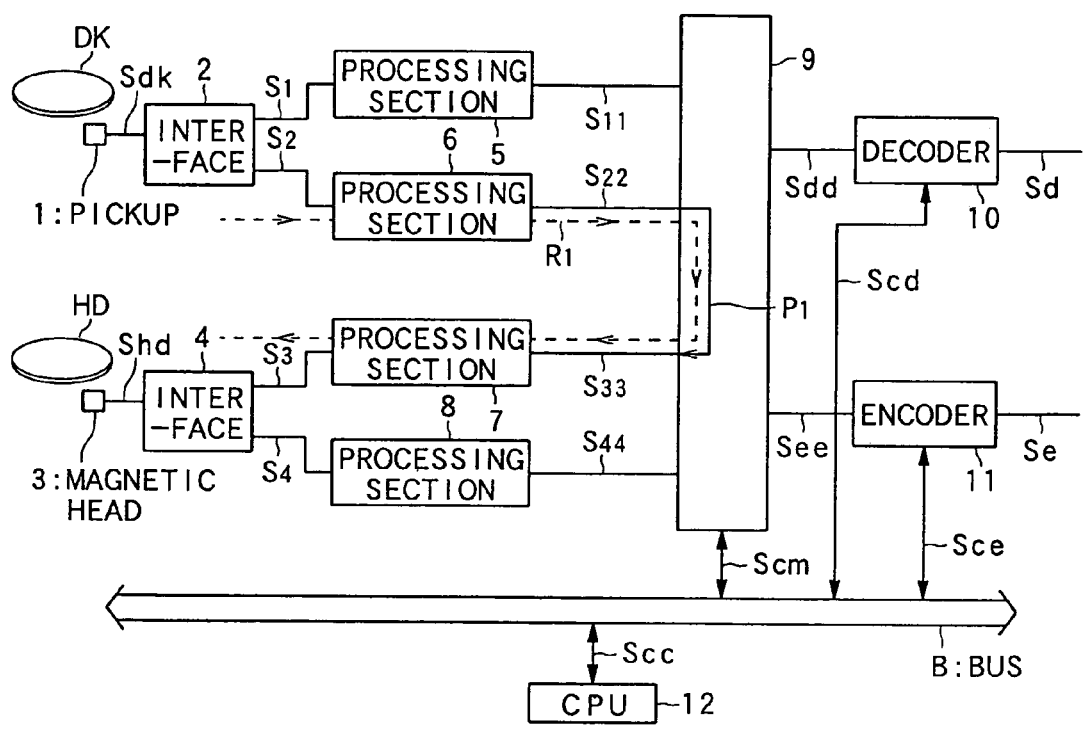
FIG. 4A is a block diagram showing a flow of information before switching.
Figure 4B:
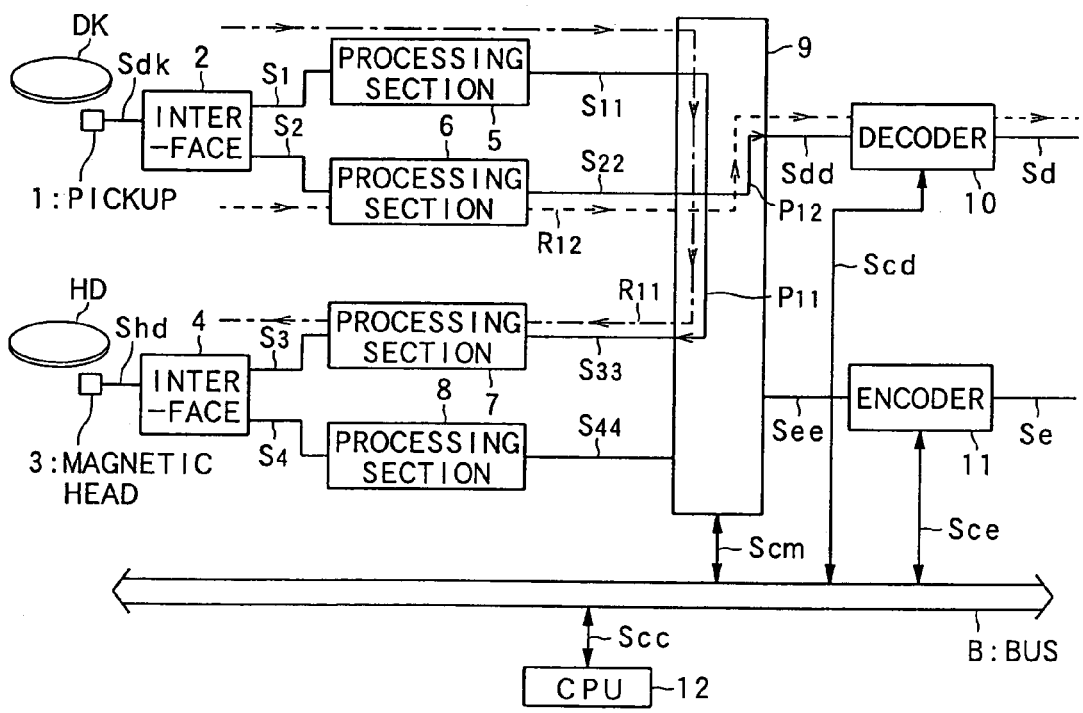
FIG. 4B is a block diagram showing a flow of information after switching.

In Embodiment 1 of the switching operation, the state of FIG. 4A is switched to the state of FIG. 4B. In FIG. 4A, copying is performed so that a path P1 is formed in a path switching section 9, information having been detected from an optical disc DK and decrypted by a processing section 6 is transferred along a path R1 indicated by a broken line including the path P1 in FIG. 4A, the information is encrypted by a processing section 7, and the information is recorded on a magnetic disc HD. In FIG. 4B, copying and reproduction are performed in parallel in a time-sharing manner. The copying is performed so that a path P11 is additionally formed in the path switching section 9, information having been detected from the optical disc DK and decrypted by a processing section 5 is transferred along a path R11 indicated by a broken line including the path P11 in FIG. 4B, the information is encrypted by the processing section 7, and the information is recorded on the magnetic disc HD. The reproduction is performed so that a path P12 is additionally formed in the path switching section 9, information having been detected from the optical disc DK and decrypted by the processing section 6 is transferred along a path R12 indicated by a broken line including the path P12 in FIG. 4B, and the information is further decoded by a decoder 10 and is outputted to the outside.

In the state of FIG. 4A, control information Sc2 (not shown in FIG. 4A) is outputted to the processing section 6 so that processing section information S2 is decrypted into processing section information S22 in the processing section 6, and control information Sc3 (not shown in FIG. 4A) is outputted to the processing section 7 so that processing section information S33 (i.e. the processing section information S22 inputted via the path P1) is encrypted into processing section information S3 in the processing section 7.

In the state of FIG. 4B, control information Sc1 (not shown in FIG. 4B) is outputted to the processing section 5 so that processing section information S1 is decrypted into processing section information S11 in the processing section 5, and the control information Sc3 (not shown in FIG. 4B) is outputted to the processing section 7 so that the processing section information S33 (i.e. the processing section information S11 inputted via the path P11) is encrypted into the processing section information S3 in the processing section 7. In addition, the control information Sc2 (not shown in FIG. 4B is outputted to the processing section 6 so that the processing section information S2 is decrypted into the processing section information S22 in the processing section 6, and the control information Scd is outputted to the decoder 10 so that output information Sdd (i.e. the processing section information S22 inputted via the path P12) is further decoded in the decoder 10 and is outputted to the outside.

As shown in FIG. 3, in Embodiment 1 of the switching operation, in the state of FIG. 4A in which copying is carried out from the optical disc DK to the magnetic disc HD, when an operation for performing the copying and reproduction of FIG. 4B in a time-sharing manner is carried out in an operating section (not shown), first the detection of information from the optical disk DK and the transfer of the information to the processing section 6 via the interface 2 are suspended at the completion of copying the minimum division unit of the information which has been recorded on the optical disc DK at the time of the operation (step S1). Subsequently it is confirmed whether or not transfer for copying on the magnetic disc HD is completed in the interface 4, for the minimum division unit having been transferred via the path P1, by the time of the suspension in the step S1 (step S2).

When the recording of the information on the magnetic disc HD is not completed (step S2; NO), the recording is continued until the completion of the recording. When the recording is completed (step S2; YES)., the processing section 5 is switched to a decryptable state (step S3). To be specific, in the processing of step S3, the second selecting part 24 of FIG. 2 is switched to the processing section information S1.

Subsequently the existing path P1 is removed in the path switching section 9 and the paths P11 and P12 of FIG. 4B are formed (step S4) The data path in the-processing section 7 for encryption is reset (step S5).

Then, the copying of information along the path R11 including the path P11 is restarted from the magnetic disc HD (step S6), the reproduction of information along the path R12 including the path P12 is restarted on the optical disc DK (step S7), and the copying and reproduction in the state of FIG. 4B are performed in parallel in a time-sharing manner. At this point, different pieces of encryption information are used for decrypting information in the processing section 5 that have been detected from the optical disc DK in the copying and for decrypting information in the processing section 6 that have been detected from the optical disc DK in the reproduction.

As described above, according to Embodiment 1 of the switching operation, decrypting is carried out in the two processing sections 5 and 6 and the information transmission paths are accordingly switched by the path switching section 9. Thus, it is possible to reduce the circuit size of the overall information processor S and achieve miniaturization/low cost for the information processor S as compared with the case where encryption and decrypting are performed by separate circuits or devices.

Further, since the processing sections 5, 6, and 7 are provided separately from the interfaces 2 and 4 and a pickup 1 or a magnetic head 2, the processing speed can be improved in the overall information processor S by increasing the transfer rates of information in the interfaces 2 and 4 and the pickup 1 or the magnetic head 2.

Since the transmission paths are switched by the path switching section 9 to supply information to the processing sections and the decoder 10, necessary information can be processed at higher speed as compared with the case where circuits or devices only capable of encryption or decrypting are connected in parallel to a single bus.

(II) Embodiment 2 of the Switching Operation

Referring to FIGS. 5 and 6, Embodiment 2 of the switching operation will be discussed below.

Figure 6A:
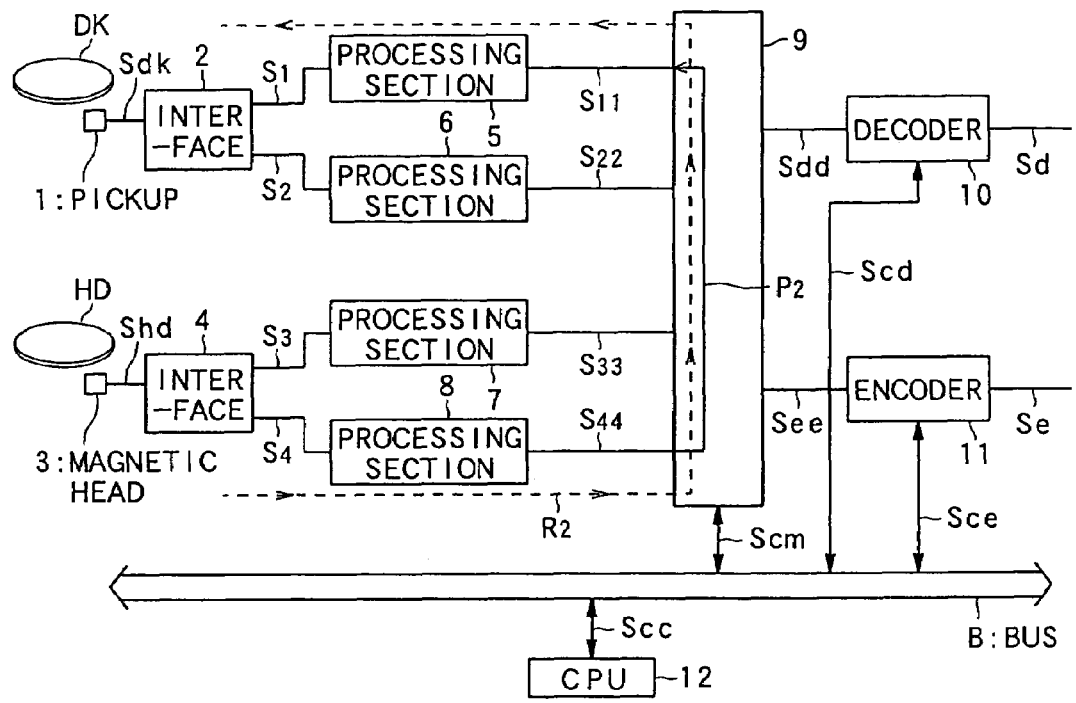
FIG. 6A is a block diagram showing a flow of information before switching.
Figure 6B:
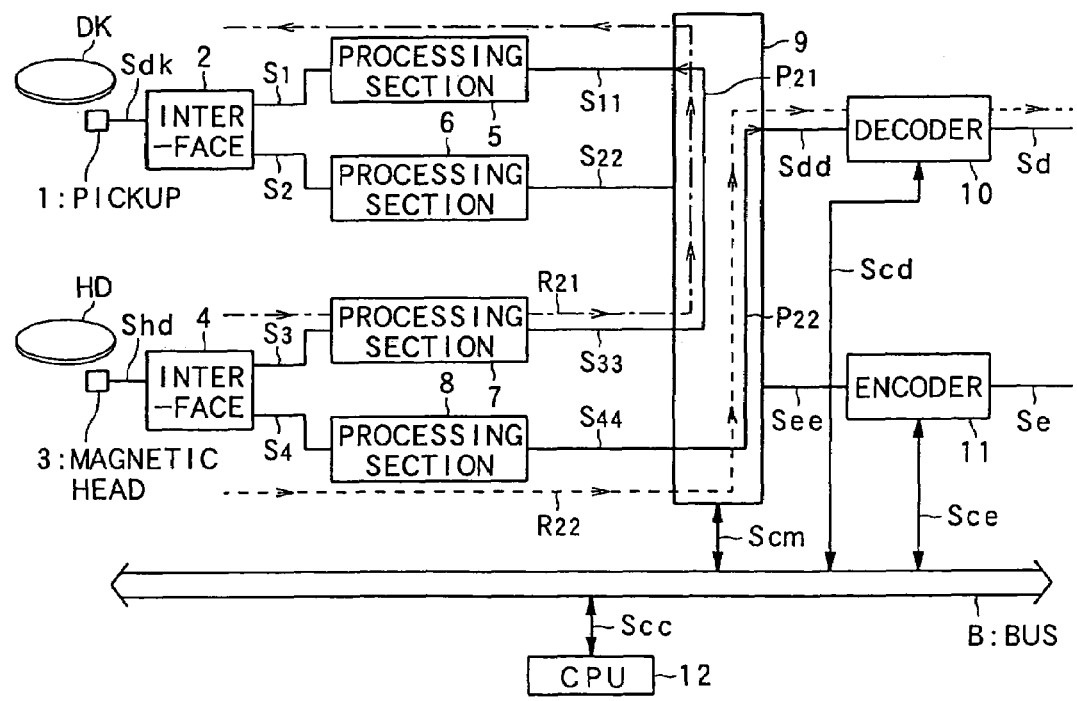
FIG. 6B is a block diagram showing a flow of information after switching.

In Embodiment 2 of the switching operation, the state of FIG. 6A is switched to the state of FIG. 6B. In FIG. 6A, copying is performed so that a path P2 is formed in a path switching section 9, information having been detected from a magnetic disc HD and decrypted by a processing section 8 is transferred along a path R2 indicated by a broken line including the path P2 in FIG. 6A, and the information is encrypted by a processing section 5 and is recorded on an optical disc DK. In FIG. 6B, copying and reproduction are performed in parallel in a time-sharing manner. The copying is performed so that a path P21 is additionally formed in the path switching section 9, information having been detected from the magnetic disc HD and decrypted by a processing section 7 is transferred along a path R21 indicated by a broken line including the path P21 in FIG. 6B, the information is encrypted by the processing section 5, and the information is recorded on the optical disc DK. The reproducing is performed so that a path P22 is additionally formed in the path switching section 9, information having been detected from the magnetic disc HD and decrypted by the processing section 8 is transferred along a path R22 indicated by a broken line including the path P22 in FIG. 6B, and the information is further decoded by a decoder 10 and is outputted to the outside.

In the state of FIG. 6A, control information Sc4 (not shown in FIG. 6A) is outputted to the processing section 8 so that processing section information S4 is decrypted into processing section information S44 in the processing section 8, and control information Sc1 (not shown in FIG. 6A) is outputted to the processing section 7 so that processing section information S11 (i.e. the processing section information S44 inputted via the path P2) is encrypted into processing section information S1 in the processing section 5.

In the state of FIG. 6B, control information Sc3 (not shown in FIG. 6B) is outputted to the processing section 7 so that processing section information S3 is decrypted into processing section information S33 in the processing section 7, and the control information Sc1 (not shown in FIG. 6B) is outputted to the processing section 5 so that the processing section information S11 (i.e. the processing section information S33 inputted via the path P21) is encrypted into the processing section information S1 in the processing section 5. In addition, the control information Sc4 (not shown in FIG. 6B) is outputted to the processing section 8 so that processing section information S4 is decrypted into processing section information S44 in the processing section 8, and the control information Scd is outputted to the decoder 10 so that output information Sdd (i.e. the processing section information S44 inputted via the path P22) is further decoded in the decoder 10 and is outputted to the outside.

As shown in FIG. 5, in Embodiment 2 of the switching operation, in the state of FIG. 6A in which copying is carried out from the magnetic disc HD to the optical disc DK, when an operation for performing the copying and reproduction of FIG. 6B in a time-sharing manner is carried out in an operating section (not shown), first the detection of information from the magnetic disk HD and the transfer of the information to the processing section 8 via the interface 4 are suspended at the completion of copying the minimum division unit of the information which has been recorded on the magnetic disc HD at the time of the operation (step S10). Subsequently it is confirmed whether or not transfer for copying on the optical disc DK is completed in the interface 2, for the minimum division unit having been transferred via the path P2, by the time of the suspension in the step S10 (step S11).

When the recording of the information on the optical disc DK is not completed (step S11; NO), the recording is continued until the completion of the recording. When the recording is completed (step S11; YES), the processing section 7 is switched to a decryptable state (step S12). To be specific, in the processing of step S12, the second selecting part 24 of FIG. 2 is switched to the processing section information S3.

Subsequently the existing path P2 is removed in the path switching section 9 and the paths P21 and P22 of FIG. 6B are formed (step S13). The data path in the processing section 5 for encryption is reset (step S14).

Then, the copying of information along the path R21 including the path P21 is restarted from the optical disc DK (step S15), the reproduction of information along the path R22 including the path P22 is restarted on the magnetic disc HD (step S16), and the copying and reproduction in the state of FIG. 6B are performed in parallel in a time-sharing manner. At this point, different pieces of encryption information are used for decrypting information in the processing section 7 that have been detected from the magnetic disc HD in the copying operation and for decrypting information in the processing section 8 that have been detected from the magnetic disc HD in the reproduction.

As described above, according to Embodiment 2 of the switching operation, decrypting is carried out in the two processing sections 7 and 8 and the information transmission paths are accordingly switched by the path switching section 9. Thus, it is possible to reduce the circuit size of the overall information processor S and achieve miniaturization/low cost for the information processor S as compared with the case where encryption and decrypting are performed by separate circuits or devices.

Further, since the processing sections 5, 7, and 8 are provided separately from the interfaces 2 and 4 and a pickup 1 or a magnetic head 2, the processing speed can be improved in the overall information processor S by increasing the transfer rates of information in the interfaces 2 and 4 and the pickup 1 or the magnetic head 2.

Since the transmission paths are switched by the path switching section 9 to supply information to the processing sections and the decoder 10, necessary information can be processed at higher speed as compared with the case where circuits or devices only capable of encryption or decrypting are connected in parallel to a single bus.

(III) Embodiment 3 of the Switching Operation

Referring to FIGS. 7 and 8, Embodiment 3 of the switching operation will be discussed below.

Figure 8A:
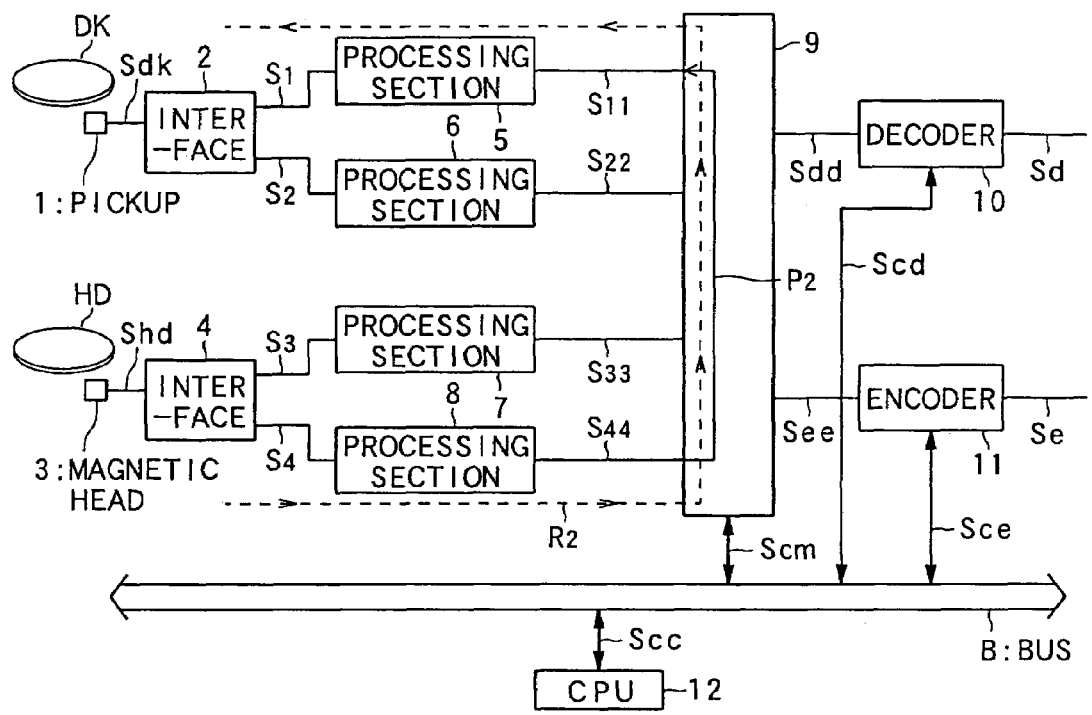
FIG. 8A is a block diagram showing a flow of information before switching.
Figure 8B:
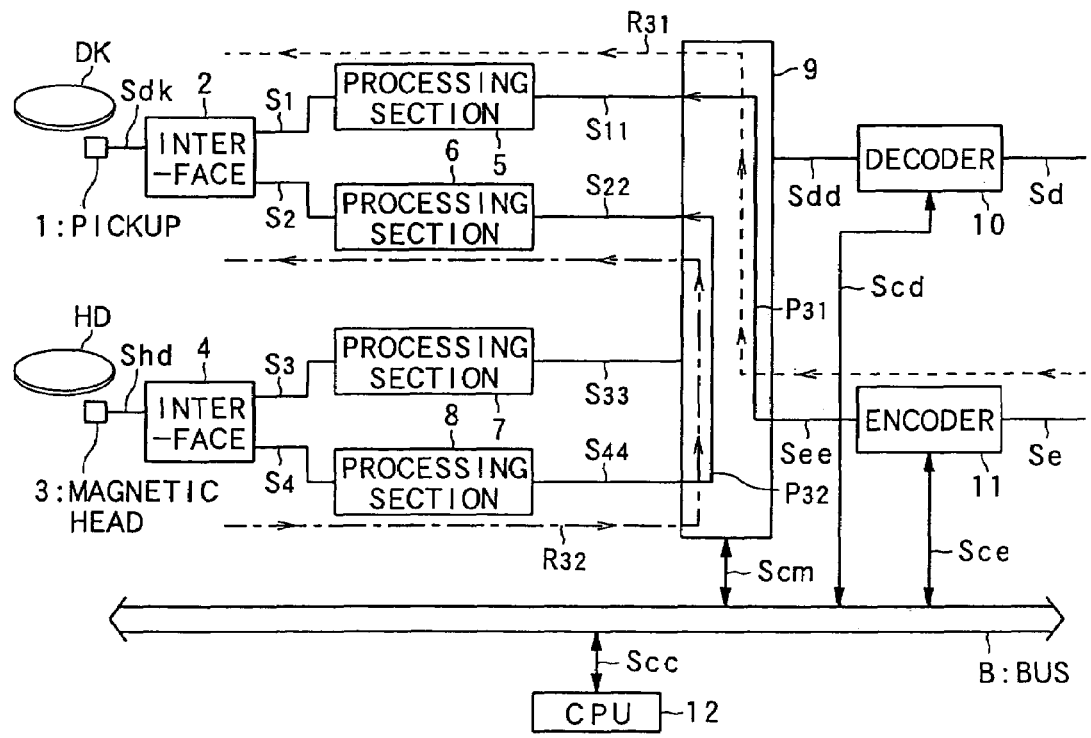
FIG. 8B is a block diagram showing a flow of information after switching.

In Embodiment 3 of the switching operation, the state of FIG. 8A is switched to the state of FIG. 8B. In FIG. 8A, copying is performed so that a path P2 is formed in a path switching section 9 as in FIG. 6A, information having been detected from a magnetic disc HD and decrypted by a processing section 8 is transferred along a path R2 indicated by a broken line including the path P2 in FIG. 8A, and the information is encrypted by a processing section 5 and is recorded on an optical disc DK. In FIG. 8B, copying and recording are performed in parallel in a time-sharing manner. The copying is performed so that a path P32 is additionally formed in the path switching section 9, information having been detected from the magnetic disc HD and decrypted by a processing section 8 is transferred along a path R32 indicated by a broken line including the path P32 in FIG. 8B, the information is encrypted by the processing section 6, and the information is recorded on the optical disc DK. The recording is performed so that a path P31 is additionally formed in the path switching section 9, input information See having been encoded by an encoder 11 is transferred along a path R31 indicated by a broken line including the path P31 in FIG. 8B, the information is encrypted by a processing section 6, and the information is recorded on the optical disc DK.

In the state of FIG. 8A, the same control information Sc4 and control information Sc1 as FIG. 6A are generated and outputted to the processing sections 8 and 5, respectively.

In the state of FIG. 8B, the control information Sc4 (not shown in FIG. 8B) is outputted to the processing section 8 so that processing section information S4 is decrypted into processing section information S44 in the processing section 8, and control information Sc2 (not shown in FIG. 8B) is outputted to the processing section 6 so that processing section information S22 (i.e. the processing section information S44 inputted via the path P32) is encrypted into processing section information S2 in the processing section 6. In addition, control information Sce is outputted to the encoder 11 so that external input information Se is encoded into input information See in the encoder 11 and is outputted to the path switching section 9, and the control information Sc1 (not shown in FIG. 8B) is outputted to the processing section 5 so that processing section information S11 (i.e. the input information See inputted via the path P31) is encrypted into processing section information S in the processing section 5.

As shown in FIG. 7, in Embodiment 3 of the switching operation, in the state of FIG. 8A in which copying is carried out from the magnetic disc HD to the optical disc DK, when an operation for performing the copying and recording of FIG. 8B in a time-sharing manner is carried out in an operating section (not shown), first the detection of information from the magnetic disk HD and the transfer of the information to the processing section 8 via an interface 4 are suspended at the completion of copying the minimum division unit of the information which has been recorded on the magnetic disc HD at the time of the operation (step S20). Subsequently it is confirmed whether or not transfer for copying on the optical disc DK is completed in an interface 2, for the minimum division unit having been transferred via the path P3, by the time of the suspension in the step S20 (step S21).

When the recording of the information on the optical disc DK is not completed (step S21; NO), the recording is continued until the completion of the recording. When the recording is completed (step S21; YES), the processing section 6 is switched to a decryptable state (step S22). To be specific, in the processing of step S22, the second selecting part 24 of FIG. 2 is switched to the processing section information S22.

Subsequently the existing path P3 is removed in the path switching section 9 and the paths P31 and P32 of FIG. 8B are formed (step S23). The data paths are reset in the processing sections 5 and 6 for encryption (step S24).

Then, the copying of information along the path R32 including the path P32 is restarted from the optical disc DK (step S25), the recording of information along the path R31 including the path P31 is restarted on the optical disc DK (step S26), and the copying and recording in the state of FIG. 8B are performed in parallel in a time-sharing manner. At this point, different pieces of encryption information are used for encrypting information in the processing section 6 that has been detected from the magnetic disc HD in the copying operation and for encrypting information in the processing section 5 that is supposed to be recorded on the magnetic disc HD in the recording.

As described above, according to Embodiment 3 of the switching operation, encryption is carried out in the two processing sections 5 and 6 and the information transmission paths are accordingly switched by the path switching section 9. Thus, it is possible to reduce the circuit size of the overall information processor S and achieve miniaturization/low cost for the information processor S as compared with the case where encryption and decrypting are performed by separate circuits or devices.

Further, since the processing sections 5, 6, and 8 are provided separately from the interfaces 2 and 4 and a pickup 1 or a magnetic head 2, the processing speed can be improved in the overall information processor S by increasing the transfer rates of information in the interfaces 2 and 4 and the pickup 1 or the magnetic head 2.

Since the transmission paths are switched by the path switching section 9 to supply information to the processing sections and the encoder 11, necessary information can be processed at higher speed as compared with the case where circuits or devices only capable of encryption or decrypting are connected in parallel to a single bus.

(IV) Embodiment 4 of the Switching Operation

Referring to FIGS. 9 and 10, Embodiment 4 of the switching operation will be discussed below.

Figure 10A:
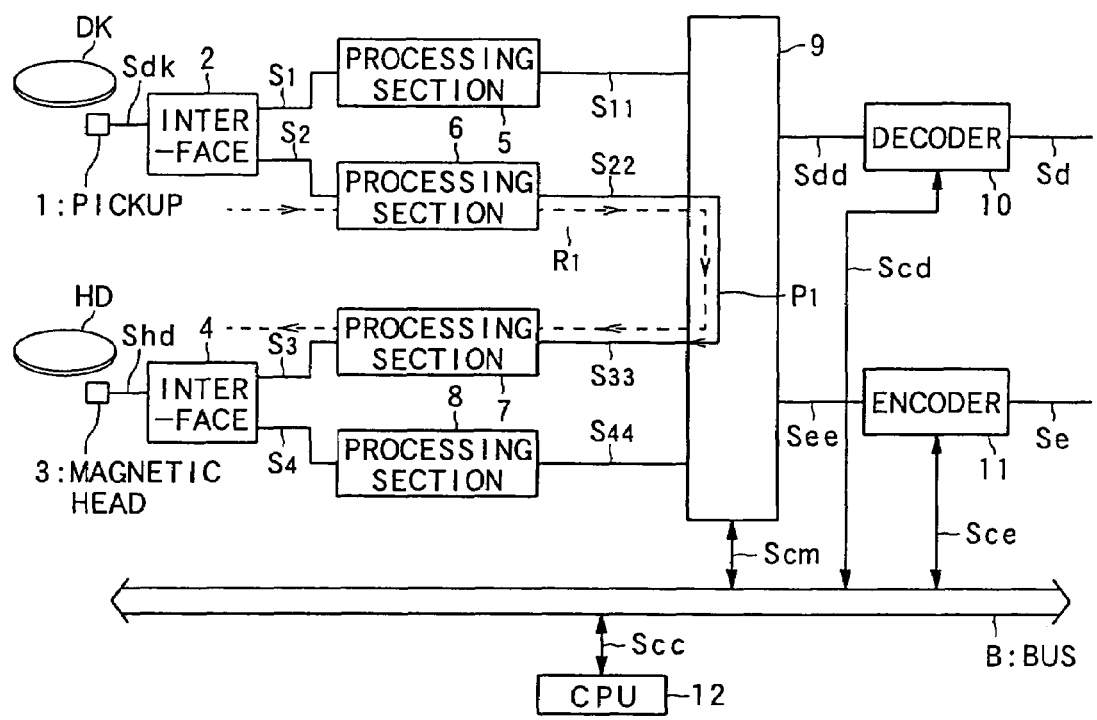
FIG. 10A is a block diagram showing a flow of information before switching.
Figure 10B:
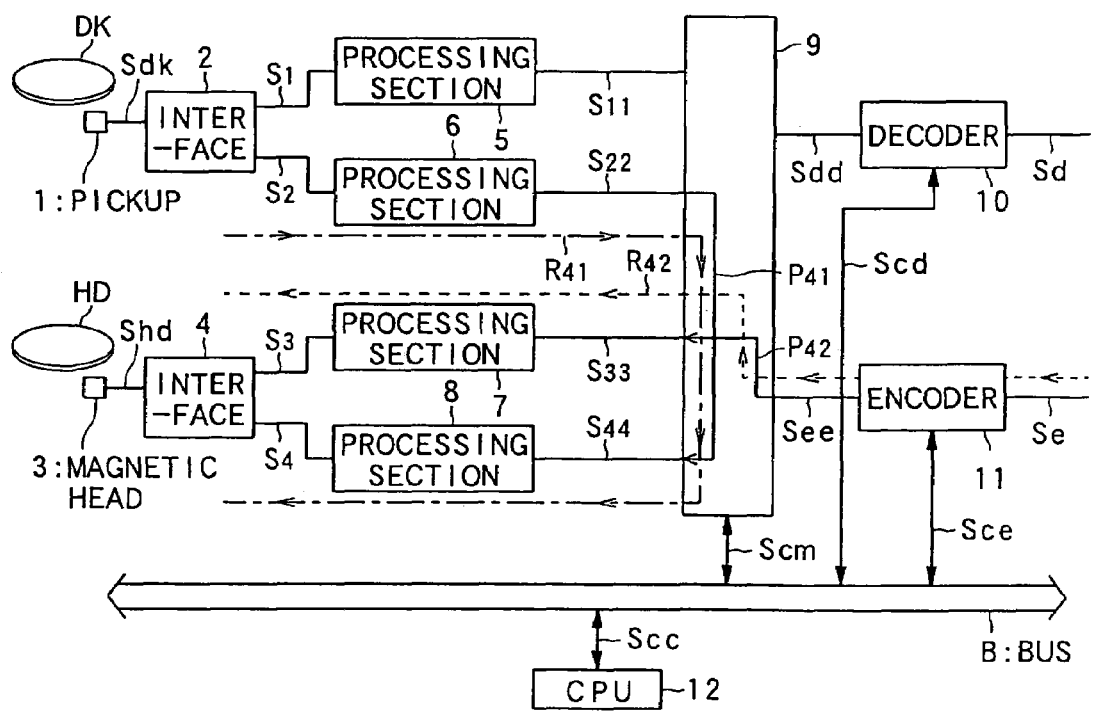
FIG. 10B is a block diagram showing a flow of information after switching.

In Embodiment 4 of the switching operation, the state of FIG. 10A is switched to the state of FIG. 10B. In FIG. 10A, copying is performed so that a path P1 is formed in a path switching section 9 as in FIG. 4A, information having been detected from an optical disc DK and decrypted by a processing section 6 is transferred along a path R1 indicated by a broken line including the path P1 in FIG. 10A, the information is encrypted by a processing section 7, and the information is recorded on a magnetic disc HD. In FIG. 10B, copying operation and recording are performed in parallel in a time-sharing manner. The copying is performed so that a path P41 is additionally formed in the path switching section 9, information having been detected from the optical disc DK and decrypted by a processing section 6 is transferred along a path R41 indicated by a broken line including the path P41 in FIG. 10B, the information is encrypted by the processing section 8, and the information is recorded on the magnetic disc HD. The recording is performed so that a path P42 is additionally formed in the path switching section 9, input information See having been encoded by an encoder 11 is transferred along a path R42 indicated by a broken line including the path P42 in FIG. 10B, the information is encrypted by the processing section 7, and the information is recorded on the magnetic disc HD.

In the state of FIG. 10A, the same control information Sc3 and control information Sc2 as FIG. 4A are generated and outputted to the processing sections 7 and 6, respectively.

In the state of FIG. 10B, the control information Sc2 (not shown in FIG. 10B) is outputted to the processing section 6 so that processing section information S2 is decrypted into processing section information S22 in the processing section 6, and control information Sc4 (not shown in FIG. 10B) is outputted to the processing section 8 so that processing section information S44 (i.e. the processing section information S22 inputted via the path P41) is encrypted into processing section information S4 in the processing section 8. In addition, control information Sce is outputted to the encoder 11 so that external input information Se is encoded into input information See in the encoder 11 and is outputted to the path switching section 9, and the control information Sc3 (not shown in FIG. 10B) is outputted to the processing section 7 so that processing section information S33 (i.e. the input information See inputted via the path P42) is encrypted into processing section information S3 in the processing section 7.

As shown in FIG. 9, in Embodiment 4 of the switching operation, in the state of FIG. 10A in which copying is carried out from the optical disc DK to the magnetic disc HD, when an operation for performing the copying and recording of FIG. 10B in a time-sharing manner is carried out in an operating section (not shown), first the detection of information from the optical disk DK and the transfer of the information to the processing section 6 via an interface 2 are suspended at the completion of copying the minimum division unit of the information which has been recorded on the optical disc DK at the time of the operation (step S30). Subsequently it is confirmed whether or not transfer for copying on the magnetic disc HD is completed in an interface 4, for the minimum division unit having been transferred via the path P4, by the time of the suspension in the step S30 (step S31).

When the recording of the information on the magnetic disc HD is not completed (step S31; NO), the recording is continued until the completion of the recording. When the recording is completed (step S31; YES), the processing section 8 is switched to a state capable of encryption (step S32). To be specific, in the processing of step S32, the second selecting part 24 of FIG. 2 is switched to the processing section information S44.

Subsequently the existing path P4 is removed in the path switching section 9 and the paths P41 and P42 of FIG. 10B are formed (step S33). The data paths are reset in the processing sections 7 and 8 for encryption (step S34).

Then, the copying of information along the path R41 including the path P41 is restarted from the optical disc DK (step S35), the recording of information along the path R42 including the path P42 is restarted on the magnetic disc HD (step S36), and the copying and recording in the state of FIG. 10B are performed in parallel in a time-sharing manner. At this point, different pieces of encryption information are used for encrypting information in the processing section 8 that has been detected from the optical disc DK in the copying and for encrypting information in the processing section 7 that is supposed to be recorded on the magnetic disc HD in the recording.

As described above, according to Embodiment 4 of the switching operation, encryption is carried out in the two processing sections 7 and 8 and the information transmission paths are accordingly switched by the path switching section 9. Thus, it is possible to reduce the circuit size of the overall information processor S and achieve miniaturization/low cost for the information processor S as compared with the case where encryption and decrypting are performed by separate circuits or devices.

Further, since the processing sections 6, 7, and 8 are provided separately from a pickup 1 or a magnetic head 2, the processing speed can be improved in the overall information processor S by increasing the transfer rates of information in the pickup 1 or the magnetic head 2.

Since the transmission paths are switched by the path switching section 9 to supply information to the processing sections and the encoder 11, necessary information can be processed at higher speed as compared with the case where circuits or devices only capable of encryption or decrypting are connected in parallel to a single bus.

As described in the embodiments, according to the operations of the information processor S in the embodiments, encryption and decrypting are performed in the processing section 5, 6, 7 or 8, and the transmission paths of information are switched accordingly. Thus, it is possible to reduce the circuit size of the overall information processor S and achieve miniaturization/low cost for the information processor S as compared with the case where encryption and decrypting are performed by separate circuits or devices.

Further, since the processing section 5 and the like are provided separately from the interfaces 2 and 4 and the pickup 1 or the magnetic head 2, the processing speed can be improved in the overall information processor S by increasing the transfer rates of information in the interfaces 2 and 4 and the pickup 1 or the magnetic head 2.

Since the transmission paths are switched by the path switching section 9 to supply information to the processing sections and the decoder 10, necessary information can be processed at higher speed as compared with the case where circuits or devices only capable of encryption or decrypting are connected in parallel to a single bus.

Furthermore, the processing sections correspond to different kinds of encryption information and thus it is possible to achieve compatibility between miniaturization/low cost for the information processor S and the integrity of information on the optical disc and the like. The integrity is increased by recording the information, which is encrypted using different kinds of encryption information, on the single optical disc DK or the magnetic disc HD.

Further, it is possible to quickly reproduce/output information from the optical disc DK or the magnetic disc HD to the outside in parallel with encryption/copying of information from the optical disc DK (or the magnetic disc HD) to the magnetic disc HD (or the optical disc DK).

Moreover, it is possible to quickly record information, which has been inputted from the outside, on the optical disc DK or the magnetic disc HD in parallel with the encryption/copying of information from the optical disc DK (or the magnetic disc HD) to the magnetic disc HD (or the optical disc DK).

Additionally, in the processing sections, the second operation part 21 performs encryption and decrypting by using the selection results of the first selecting part 23 and the second selecting part 24, which are provided in each of the processing sections. Hence, necessary encryption and decrypting can be quickly performed with a simple circuit configuration.

The embodiments described the information processor S uses the optical disc DK and the magnetic disc HD as recording mediums. In addition, the present invention is applicable to the copying, reproduction, or recording of information in an information processor is provided with two or more recording mediums capable of recording and reproduction.

Besides, the input source of information to be recorded on the optical disc DK or the magnetic disc HD may be a wired information reproducing apparatus and may be a tuner and the like for receiving airwaves.

Moreover, programs corresponding to the flowcharts of FIGS. 3, 5, 7 or 9 are recorded or retrieved via a network including the Internet and the programs are read and executed by a general purpose computer including a microcomputer, so that the microcomputer can be caused to function as the CPU 12 of the embodiments.

It should be understood that various alternatives to the embodiment of the invention described herein may be employed in practicing the invention. Thus, it is intended that the following claims define the scope of the invention and that methods and structures within the scope of these claims and their equivalents be covered thereby.

The entire disclosure of Japanese Patent Application No. 2003-132267 filed on May 9, 2003 including the specification, claims, drawings and summary are incorporated herein by reference in its entirety

What is claimed is:

1. An information processing apparatus, comprising:
   two or more processing devices which record information on a recording medium or reproduce the information recorded on a recording medium, and include an encrypting/decrypting device which is capable of encrypting the information to be recorded when the information is recorded on the recording medium or decrypting the information to be reproduced from the recording medium when the information is reproduced from the recording medium;

a control device which controls the encrypting/decrypting device so as to perform one of the encrypting operation and the decrypting operation;

a switching device which switches a transmission path of the information to the encrypting/decrypting device in response to one of the operations performed by the encrypting/decrypting device; and two or more interface devices, each of which is located between a recording medium and a processing device, wherein one of the processing devices decrypts the information to be reproduced from a recording medium via one of the interface devices and another one of the processing devices encrypts the information to be recorded on another recording medium via another one of the interface devices, at the same time.

2. The information processing apparatus according to claim 1, wherein the recording medium can record the information encrypted using different kinds of encryption information, and the encrypting/decrypting device performs the encrypting operation for encrypting the information by using the different kinds of encryption information and performs the decrypting operation by using the encryption information used in the encrypting operation.

3. The information processing apparatus according to claim 2, wherein the processing apparatus includes the two or more processing devices, the control device and the switching device control the first encrypting/decrypting device provided for the first processing device and switch the transmission path so that the information is decrypted, the information having been reproduced from a first recording medium by a first processing device and having been encrypted using a first encryption information, the control device and the switching device control a second encrypting/decrypting device provided for the first processing device so that the information is decrypted, the information having been reproduced from the first recording medium by the first processing device and having been encrypted using a second encryption information, and the control device and the switching device control the first encrypting/decrypting device provided for a second processing device and switch the transmission path so that the information decrypted by the second encrypting/decrypting device is encrypted by the first encrypting/decrypting device provided for the second processing device and the information is recorded on a second recording medium by the second processing device.

4. The information processing apparatus according to claim 2, wherein the processing apparatus includes the two or more processing devices, the control device and the switching device control a first encrypting/decrypting device provided for a first processing device and switch the transmission path so that the information is encrypted using first encryption information by the first encrypting/decrypting device provided for a first processing device and the information is recorded on a first recording medium by using the first processing device, the control device and the switching device control the encrypting/decrypting device provided for a second processing device so that the information is decrypted, the information having been reproduced from a second recording medium by the second processing device and having been encrypted using second encryption information, and the control device and the switching device control the encrypting/decrypting device provided for the second processing device and the second encrypting/decrypting device provided for the first processing device and switch the transmission path so that the information decrypted by the encrypting/decrypting device is encrypted by the second encrypting/decrypting device provided for the first processing device and the information is recorded on the first recording medium by the first processing device.

5. The information processing apparatus according to claim 4, wherein the encrypting/decrypting device comprises:

a first selecting device which selects one of the predetermined encryption information and predetermined inverse encryption information indicating reversing the sign of the encryption information;

a second selecting device which selects one of the information and encryption information to be decrypted, the encryption information being obtained by encrypting the information; and an operation device which performs one of the encrypting operation or the decrypting operation according to a selection result from the first selecting device and the second selecting device; wherein when the encrypting/decrypting device is caused to perform the encrypting operation, the control device causes the first selecting device to select the encryption information and the second selecting device to select the information, and controls the operation device so that the encrypting operation is performed in the operation device according to the selected encryption information and the selected information, and when the encrypting/decrypting device is caused to perform the decrypting operation, the control device causes the first selecting device to select the inverse encryption information and the second selecting device to select the encryption information, and controls the operation device so that the decrypting operation serving as an inverse operation with respect to the encrypting operation is performed in the operation device according to the selected inverse encryption information and the selected encryption information.

6. An information processing method comprising:

two or more processing processes of recording information on a recording medium or reproducing the information recorded on a recording medium, and including an encrypting/decrypting step of encrypting the information to be recorded when the information is recorded on the recording medium or decrypting the information to be reproduced from the recording medium when the information is reproduced from the recording medium;

a control process of controlling the encrypting/decrypting device so as to perform one of the encrypting operation and the decrypting operation;

a switching process of switching a transmission path of the information to the encrypting/decrypting step in response to one of the operations performed by the encrypting/decrypting step; and two or more interface processes of interfacing the information between a recording onto/reproducing from a recording medium process and the processing process, wherein one of the processing processes decrypts the information to be reproduced from a recording medium via one of the interface processes and another one of the processing processes encrypts the information to be recorded on another recording medium via another one of the interface processes, at the same time.

7. An information recording medium in which an information processing program is recorded in a readable way by a recording computer included in an information processing apparatus, the information processing program causing the recording computer to function as:

two or more processing devices which record information on a recording medium or reproduce the information recorded on a recording medium, and include an encrypting/decrypting device which is capable of encrypting the information to be recorded when the information is recorded on the recording medium or decrypting the information to be reproduced from the recording medium when the information is reproduced from the recording medium;

a control device which controls the encrypting/decrypting device so as to perform one of the encrypting operation and the decrypting operation;

a switching device which switches a transmission path of the information to the encrypting/decrypting device in response to one of the operations performed by the encrypting/decrypting device; and two or more interface devices, each of which is located between a recording medium and a processing device, wherein one of the processing devices decrypts the information to be reproduced from a recording medium via one of the interface devices and another one of the processing devices encrypts the information to be recorded on another recording medium via another one of the interface devices, at the same time.

8. An information processing program for a computer which is included in an information processing apparatus, the program causing the computer to function as:

two or more processing devices which record information on a recording medium or reproduce the information recorded on a recording medium, and include an encrypting/decrypting device which is capable of encrypting the information to be recorded when the information is recorded on the recording medium or decrypting the information to be reproduced from the recording medium when the information is reproduced from the recording medium;

a control device which controls the encrypting/decrypting devices so as to perform one of the encrypting operation and the decrypting operation;

a switching device which switches a transmission path of the information to the encrypting/decrypting device in response to one of the operations performed by the encrypting/decrypting device; and two or more interface devices, each of which is located between a recording medium and a processing device, wherein one of the processing devices decrypts the information to be reproduced from a recording medium via one of the interface devices and another one of the processing devices encrypts the information to be recorded on another recording medium via another one of the interface devices, at the same time.

* * * * *